Jan. 13, 1970 R. L. EASTON 3,490,044

COMMUNICATIONS SYSTEM

Filed Nov. 5, 1968 2 Sheets-Sheet 1

INVENTOR

ROGER L. EASTON

BY James G Murray

[signature] ATTORNEYS

Jan. 13, 1970 R. L. EASTON 3,490,044

COMMUNICATIONS SYSTEM

Filed Nov. 5, 1968 2 Sheets-Sheet 2

INVENTOR

ROGER L. EASTON

BY James G Murray
R. Sciascia
ATTORNEYS

United States Patent Office 3,490,044
Patented Jan. 13, 1970

3,490,044
COMMUNICATIONS SYSTEM
Roger L. Easton, 7704 Oxon Hill Road SE., Washington, D.C. 20021
Filed Nov. 5, 1968, Ser. No. 773,454
Int. Cl. H04j 1/20
U.S. Cl. 325—34 7 Claims

ABSTRACT OF THE DISCLOSURE

Communication system requiring a very narrow bandwidth for transmission of an input signal (such as from voice or music). Amplitude and frequency modulations of input signal are transmitted as phase modulations of two different frequency signals. After transmission, these phase modulated signals are used to reproduce the input signal.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In the field of multi-channel communications, such as AM and FM radio, long-distance telephony, etc., the bandwidth requirements for the individual communication channel is a factor which limits the number of individual channels which are permissible. Commercial telephone lines usually provide a frequency bandwidth of approximately 2700 cycles for each channel of (voice) communication. A much greater bandwidth is required for the FM radio transmission of music. The commercial advantages of the herein disclosed communications system, wherein only a very narrow bandwidth is required for each channel of communication, are readily apparent.

The present invention is also advantageously applicable to military (secretive) communications. By allowing the use of very narrow bandwidth equipment with the inherent accompanying improvement in the signal-to-noise ratio and in the receiver sensitivity, less powerful and lighter weight transmitters and receivers can be used. Further, the chance of the enemy intercepting a low power, narrow bandwidth communication is much less than for the interception of a powerful, wide bandwidth communication.

As would be expected, where possible commercial and military advantages are clearly evident, the prior technology has vigorously investigated ways of maximizing the utilization of commercial communication links and of increasing the security and mobility of military communications and equipment. Commercial multiplexed microwave systems and military use of special frequencies are examples of the approaches taken by the prior technology. However, none of these prior methods have attained the beneficial results which are obtainable by the communication system of the invention herein disclosed.

SUMMARY OF THE INVENTION

The general purpose of this invention is to transmit information, primarily voice communication (although other uses such as transmitting music, etc. are obvious and contemplated), with a much narrower bandwidth requirement than is presently used. To attain this advantageous result, the present invention contemplates the separation of the frequency and amplitude variations of the information being transmitted into two separate signals which are phase modulated. After transmission, the two phase modulated signals are used to reproduce the information in its original form.

OBJECTS OF THE INVENTION

From the preceding, it will be apparent to the reader that an object of the invention is to provide an improved method of communication.

Another object is to provide a communication system with a narrower bandwidth requirement than is presently used.

A still further object is to provide an improved communications method and system which requires only a narrow bandwidth and in which the frequency and amplitude modulations of the information being transmitted are separated into two phase modulated signals which, after transmission, are used to reproduce the information in its original form.

DESCRIPTION OF THE DRAWINGS

Other objects and advantages of the invention will hereinafter become more fully apparent from the following description and from the accompanying drawings, which illustrate a preferred embodiment of the invention and wherein.

DESCRIPTION OF THE PREFERRED EMBODIMENT

It is contemplated that the primary utility of the disclosed invention will be in the transmission of audible signals, i.e. voice and music, and the preferred embodiment will be so described. However, it will be readily apparent to persons skilled in military communications, coded signals, IFF, etc., that the invention can be used for many other purposes.

Figure 1A:
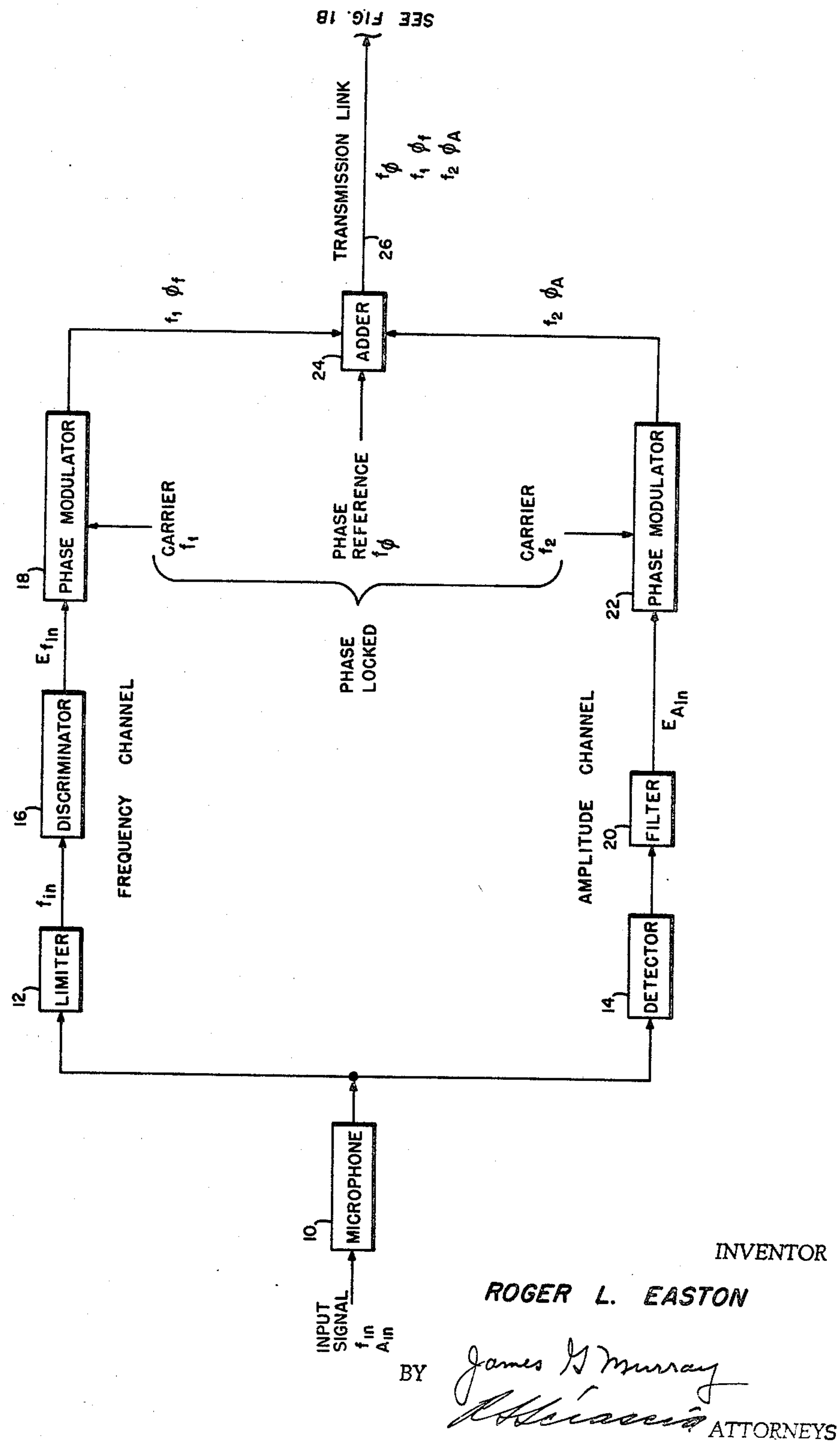
FIGS. 1A and 1B show the invention in block diagram form.

Referring now to the drawings, wherein like reference characters and symbols designate like or corresponding parts and signal parameters throughout the two figures, there is shown in FIG. 1A a microphone 10 receiving an input signal, such as the spoken word, of varying frequency $f_{in}$ and of varying amplitude $A_{in}$. The microphone 10, as is well known, transforms the oral input signal into an electric signal of the same varying frequency and amplitude. This signal is applied to a limiter 12 and to a detector 14. The limiter 12 functions to remove the amplitude variations (but not the frequency variations) from the microphone signal and thus applies a constant amplitude signal of varying frequency $f_{in}$ to the discriminator 16. Discriminator 16 is connected to phase modulator 18 and applies thereto a DC signal $E_{f_{in}}$ (proportional to the frequency $f_{in}$) which controls the phase modulation of a constant frequency carrier signal $f_1$. The limiter 12, discriminator 16 and phase modulator 18 can be conveniently termed a frequency channel which functions to produce a constant frequency signal $f_1\phi_f$, the varying phase of which is representative of the varying frequency $f_{in}$.

Detector 14 is connected through a low pass filter 20 to a second phase modulator 22. The detector and filter function to eliminate the frequency components from the microphone signal and to produce a DC "envelope" voltage $E_{A_{in}}$ which is proportional to the amplitude of the microphone signal. This voltage is applied to phase modulator 22 and controls the phase modulation of a constant frequency carrier signal $f_2$. The detector 14, filter 20 and phase modulator 22 can be considered as an amplitude channel which functions to produce a constant frequency signal $f_2\phi_A$, the varying phase of which is representative of the varying amplitude $A_{in}$.

Figure 1B:
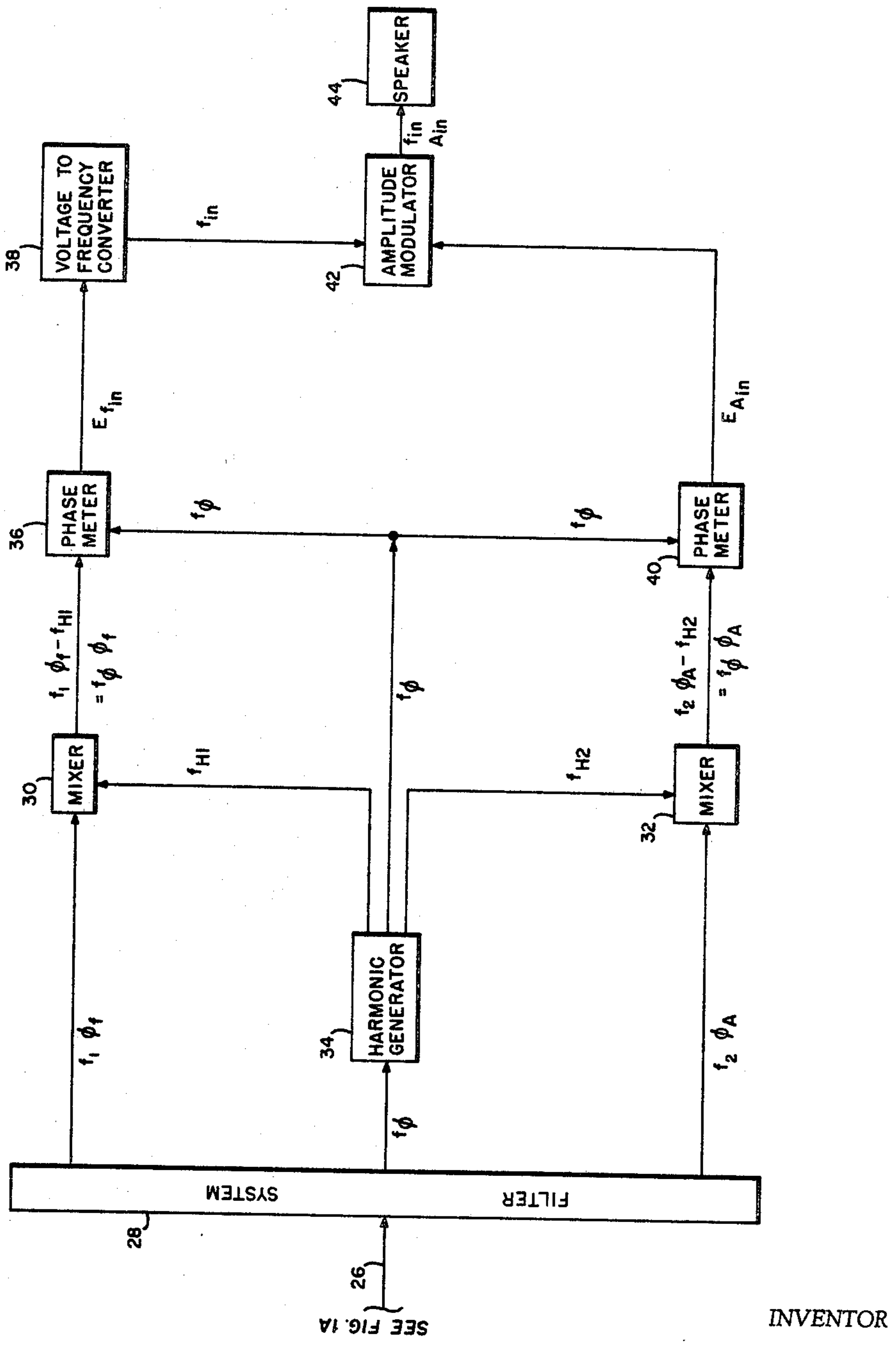

The outputs of phase modulators 18 and 22 and a constant frequency phase reference signal $f_\phi$ are combined in adder 24 and transmitted over a transmission link 26, the exact nature of which is not material and will vary with the use made of the invention. Link 26, for example, may be a "hard wire" link between military outposts or a microwave link in a commercial telephone system. In the latter event the reader will, of course, recognize that the adder and the filter system 28 (shown in FIG. 1B) include other apparatus, not shown, for the production, modulation, radiation, reception and elimination of the R.F. carrier. The reader will also recognize that, as shown in FIG. 1A, the signals $f_1$, $f_2$ and $f_\phi$ are phase locked according to well known practices and techniques.

After transmission by link 26, the filter system 28 separates the signal components and applies the component $f_1\phi_f$ to mixer 30, the component $f_2\phi_A$ to mixer 32 and the phase reference signal $f\phi$ to harmonic generator 34. This generator, in addition to the phase reference signal $f_\phi$, produces harmonics $f_{H1}$ and $f_{H2}$ thereof which are respectively applied to mixers 30 and 32. The carrier frequencies $f_1$ and $f_2$ and the harmonic frequencies $f_{H1}$ and $f_{H2}$ are chosen so that $f_1-f_{H1}=f_2-f_{H2}=f_\phi$. An output $f_\phi\phi_f$ of mixer 30 is thus a signal at the same frequency as the phase reference signal and with a phase related to the frequency $f_{in}$ of the signal of microphone 10. This output signal of mixer 30 is connected to phase meter 36 which is also connected to receive the phase reference signal $f_\phi$ from generator 34. Phase meter 36 produces an output voltage $E_{f_{in}}$ related to the phase difference between its two inputs and also to the frequency $f_{in}$ of the signal produced by microphone 10. The voltage $E_{f_{in}}$ is applied to control a voltage-to-frequency converter 38 which accordingly reproduces the varying frequency $f_{in}$.

The mixer 32 similarly produces an output $f_\phi\phi_A$ at the same frequency as the phase reference signal and with a phase related to the amplitude $A_{in}$ of the signal of microphone 10. This output signal of mixer 32 is connected to phase meter 40 which is also connected to receive the phase reference signal $f_\phi$ from generator 34. Phase meter 40 produces an output voltage $E_{A_{in}}$ related to the phase difference between its two inputs and also to the amplitude $A_{in}$ of the signal produced by microphone 10. This voltage, as well as the signal $f_{in}$ from converter 38, is connected to amplitude modulator 42 which produces an output signal having a varying frequency $f_{in}$ and a varying amplitude $A_{in}$. This output signal of modulator 42 is similar to the output signal of microphone 10 and can be applied to speaker 44 to substantially reproduce the oral input signal to microphone 10.

By now the operation and advantages of the invention will be apparent. The input signal is transformed by the frequency channel 12, 16 and 18 and by the amplitude channel 14, 20 and 22 into two phase modulated signals $f_1$ and $f_2$, which are practically CW in bandwidth requirements. These two signals and the third signal (the CW phase reference signal $f_\phi$) which are transmitted by link 26 are adaptable to very narrow bandwidth techniques which allow high bandwidth utilization and the use of apparatus that can be less powerful, lighter and more sensitive because of advantageous signal-to-noise ratio characteristics. After transmission, the phase of the two varying phase signals and of the phase reference signal are compared by phase meters 36 and 40 to produce voltages which are utilized by components 38 and 42 to produce the input signal.

Obviously many modifications and variations of the present invention are possible in the light of the above teachings. One readily apparent variation would envision the present invention as a minor part of a complex electronic system wherein the two phase modulated signals would be transmitted by separate links and the reference signal would be available (from other systems) at the receiver. It is therefore to be understood, that within the scope of the appended claims, the invention may be practiced otherwise than as specifically described.

What is claimed and desired to be secured by Letters Patent of the United States is:

1. Apparatus for transmitting information from a first location to a second location comprising:

Signal producing means for receiving said information and for producing an electrical signal representative of said information;

Frequency channel means connected to said signal producing means and including a discriminator for producing a first phase modulated signal wherein the phase modulations are representative of the frequency variations in said electrical signal;

Amplitude channel means connected to said signal producing means and including a detector for producing a second phase modulated signal wherein the phase modulations are representative of the amplitude variations in said electrical signal;

Transmission means for transmitting said first and second phase modulated signals from said first location to said second location and Combining means for receiving and combining said first and second phase modulated signals to reproduce said electrical signal.

2. The apparatus of claim 1 and further including a reproducing means connected to said combining means for reproducing said information.

3. A communication system comprising:

A microphone for producing a first electrical signal in response to an audio input;

An adder connected to receive a constant frequency phase reference signal of a first frequency;

Frequency channel means connected between said microphone and said adder and also connected to receive a first carrier signal of a second frequency, said first carrier signal being phase locked to said phase reference signal, said frequency channel means functioning to phase modulate said first carrier signal in a manner such that the phase modulations of said first carrier signal are representative of the frequency variations in said first electrical signal;

Amplitude channel means connected between said microphone and said adder and also connected to receive a second carrier signal of a third frequency, said second carrier signal being phase locked to said phase reference signal, said amplitude channel means functioning to phase modulate said second carrier signal in a manner such that the phase modulations of said second carrier signal are representative of the amplitude variations in said first electrical signal;

A transmission link operatively coupled to said adder to transmit said phase modulated first and second carrier signals and said phase reference signals;

Filter system means operatively coupled to said transmission link and functioning to separate said phase modulated first and second carrier signals and said phase reference signal;

Combining means connected to said filter system means and functioning to combine said phase modulated first and second carrier signals and said phase reference signal and to produce therefrom a second electrical signal which is substantially the same as said first electrical signal and A speaker connected to receive said second electrical signal.

4. The communication system of claim 3 wherein said frequency channel means includes a limiter, discriminator and first phase modulator connected in series; the input of said limiter being connected to said microphone and the output of said first phase modulator being connected to said adder; and an input of said first phase modulator being said first carrier signal.

5. The communication system of claim 3 wherein said amplitude channel means includes a detector, filter and second phase modulator connected in series; the input of said detector being connected to said microphone and the output of said second phase modulator being connected to said adder; and an input of said second phase modulator being said second carrier signal.

6. The communication system of claim 3 wherein said combining means comprises:

Harmonic generator means connected to said filter system means to receive said phase reference signal and functioning to produce first and second harmonic signals of said phase reference signal;

A first mixer connected to receive said phase modulated first carrier signal and said first harmonic signal;

A second mixer connected to receive said phase modulated second carrier signal and said second harmonic signal;

First and second phase meters connected respectively to said first and second mixers and to each receive said phase reference signal;

A voltage-to-frequency converter connected to said first phase meter and

An amplitude modulator connected to said second phase meter and to said voltage-to-frequency converter.

7. The communication system of claim 6 wherein:

Said frequency channel means includes a limiter, discriminator and first phase modulator connected in series; the input of said limiter being connected to said microphone and the output of said first phase modulator being connected to said adder; and an input of said first phase modulator being said first carrier signal and Said amplitude channel means includes a detector, filter and second phase modulator connected in series; the input of said detector being connected to said microphone and the output of said second phase modulator being connected to said adder; and an input of said second phase modulator being said second carrier signal.

References Cited

UNITED STATES PATENTS 3,328,526 6/1967 Schroeder ------------ 179—1.5

RODNEY D. BENNETT, Jr., Primary Examiner

CHARLES E. WANDS, Assistant Examiner

U.S. Cl. X.R.

179—1.5; 325—33